United States Patent [19]

Fajula et al.

[11] Patent Number: 5,310,534
[45] Date of Patent: May 10, 1994

[54] PROCESS FOR DEALUMINIZATION OF THE SYNTHETIC ZEOLITES OF LARGE PORES, CATALYSTS AND SELECTIVE ORGANOPHILIC ADSORBENTS CONTAINING THE DEALUMINIZED ZEOLITES OBTAINED ACCORDING TO THE PROCESS AND ESSENTIALLY SILICIC BETA ZEOLITE

[75] Inventors: Francois Fajula; Elodie Bourgeat-Lami, both of Montpellier; Catherine Zivkov, Orthez; Thierry Des Courieres, Lyons; Didier Anglerot, Lons, all of France

[73] Assignee: Societe Nationale Elf Aquitaine, Paris, France

[21] Appl. No.: 798,543

[22] Filed: Nov. 26, 1991

[30] Foreign Application Priority Data

Nov. 26, 1990 [FR] France .................... 90 14749

[51] Int. Cl.$^5$ .................. C01B 33/34; B01J 20/18; B01J 29/04
[52] U.S. Cl. .................. 423/715; 423/DIG. 27; 423/714; 502/60
[58] Field of Search .................. 502/60, 85; 423/714, 423/715, DIG. 27

[56] References Cited

U.S. PATENT DOCUMENTS

| 3,442,795 | 5/1969 | Kerr et al. | 502/85 |
| 4,414,189 | 11/1983 | Kokotailo et al. | 423/715 |
| 4,851,200 | 7/1989 | Ryan | 423/715 |
| 4,916,097 | 4/1990 | Chu et al. | 502/85 |
| 5,116,794 | 5/1992 | Skeels et al. | 502/85 |

FOREIGN PATENT DOCUMENTS

| 95846 | 12/1983 | European Pat. Off. | 502/60 |
| 0142313 | 5/1985 | European Pat. Off. | 423/714 |
| 6125321 | 10/1981 | Japan | 502/85 |

Primary Examiner—Carl F. Dees
Attorney, Agent, or Firm—Burgess, Ryan and Wayne

[57] ABSTRACT

A process is provided for dealuminization of zeolites having large pores, the diameter of the aperture of the pores being greater than or equal to about 0.7 nm and the silica/alumina ratio greater than or equal to about 6. The process comprises acid leaching of the raw zeolite containing the structuring agent.

The dealuminized zeolites obtained are useful as catalysts for the transformation of hydrocarbons and as selective organophilic adsorbents.

21 Claims, No Drawings

PROCESS FOR DEALUMINIZATION OF THE SYNTHETIC ZEOLITES OF LARGE PORES, CATALYSTS AND SELECTIVE ORGANOPHILIC ADSORBENTS CONTAINING THE DEALUMINIZED ZEOLITES OBTAINED ACCORDING TO THE PROCESS AND ESSENTIALLY SILICIC BETA ZEOLITE

BACKGROUND OF THE INVENTION

Field of the Invention

This invention concerns a process for dealuminization of zeolites of large pores and elevated silica/alumina ratio.

Background Art

Zeolites are crystallized aluminosilicates belonging to the group of the tectosilicates. Their tridimensional structure is formed by a series of tetrahedra $SiO_4$ and $AlO_4$ having common oxygenated vertices. This arrangement defines the channels and cavities where the cations come to lodge that compensate for the deficiency of charge associated with the presence of aluminum in the covalent framework and the water molecules.

Some of the zeolites are of natural origin. There is likewise known an increasing number of synthetic zeolites which do not always have an equivalent in nature.

The zeolites can be regrouped in three different families according to the diameter of the opening of their channels. There are the large-pore zeolites, small-pore zeolites and intermediatepore zeolites.

The large-pore zeolites have a diameter of aperture of their channels above or equal to about 0.7 nm. Zeolites X, Y, the ZSM-20 and the beta zeolite form part of this family.

The large-pore zeolites are of particular interest as catalysts for the transformation of hydrocarbons, especially as catalysts for catalytic cracking in the petrochemistry and refining industries. The large pores are advantageous for the adsorption of cumbersome molecules.

The thermal stability of the zeolites increases with an increase in the silica/alumina ratio. The silica/alumina ratio is variable according to the type of zeolite; it can also change slightly as a function of the conditions of synthesis. However, it is difficult to obtain large-pore zeolites having elevated silica/alumina ratios by synthesis. To obtain such zeolites having an elevated silica/alumina ratio, recourse is had to the post-synthesis dealuminization.

The zeolites obtained by pressured dealuminization are specially useful as organophilic adsorbents since the separation of the aluminum atoms reduces the field effects in the pores.

Numerous processes exist for dealuminization of zeolites. They are in general hydrothermal or chemical treatments of a modified form of the zeolite. The modified forms are obtained by thermal decomposition of the raw form of the zeolite which contains the organic structurant used during the synthesis followed by an exchange treatment with ammonium, proton, or another cation.

The dealuminization can also be obtained by acid treatment. In this case the modified form corresponds to the protonated form. For example, according to U.S. Pat. No. 3,442,795, a zeolite in its protonated form is subjected to an acid treatment followed by the chelation of the aluminum.

European Patent Application EP-A-95 304 describes the dealuminization of the beta zeolite by acid treatment of its protonated form. The beta zeolites obtained by treatment with hydrochloric acid, preferably from 0.1 to 2N, have a silica/alumina ratio that fluctuates between 40 and 400. For a silica/alumina ratio of 40, the zeolite maintains 100% of its crystallinity. On the other hand, for a silica/alumina ratio of 280 the crystallinity is only 75%.

We have now found a process which makes it possible to dealuminize large-pore synthetic zeolites with elevated silica/alumina ratio without noticeable loss of their crystallinity. Another advantage of this method is the possibility of obtaining completely dealuminized large-pore zeolites, particularly the completely dealuminized beta zeolite. A still further advantage of this process is the recovery of the organic structurant used during the synthesis. According to the processes of the prior art, the organic quaternary ammoniums used as structurants are decomposed by calcination. Such products are in general very expensive and lead by calcination to products that are toxic for the environment such as nitrogen oxides. Therefore, this advantage is important from the economic and ecological points of view. Another advantage of the process is the possibility of carrying out the dealuminization without previous separation of the zeolite from its mother liquor present during synthesis.

SUMMARY OF THE INVENTION

The process according to the invention of dealuminization of synthetic zeolites having a diameter of aperture of the pores of more than or equal to about 0.7 nm and the silica/alumina ratio above or equal to about 6 by acid leaching comprises subjecting the zeolite to acid leaching in its raw form while containing the structurant.

We intend the terms "raw zeolite" or "raw form of the zeolite after synthesis" to mean the non-calcinated form which still contains the organic structurant. It also contains the cations that compensate the deficiency of charge associated with the presence of aluminum. This cation originates from an alkaline metal at the time of synthesis, but it can be replaced later on by any metal. This raw form of the zeolite can be subjected to the acid leaching without previous separation of the zeolite from its mother liquors present during synthesis. It is also possible to treat the zeolite in the raw form but after separation from the mother liquor.

The formula of the raw zeolite of synthesis corresponds in general to:

$$\frac{x}{n} M_2O \cdot yS \cdot Al_2O_3 \cdot zSiO_2 \cdot wH_2O$$

wherein
M is a metal cation of valence n,
S is the structuring agent $\frac{x}{n}$ is less than 1 y has a value from 0.5 to 8
z has a value from 6 to 2000
w has a value from 4 to 50.

Among the large-pore zeolites that can be dealuminized according to the invention, one can mention ZSM-20 and the beta zeolite.

DESCRIPTION OF THE PREFERRED EMBODIMENT

The process according to the invention is particularly convenient for the dealuminization of the beta zeolite. Beta zeolite is a synthetic zeolite of large pores, of tetragonal symmetry.

Its synthesis is described in a MOBIL patent of 1967 (U.S. Pat. No. 3,308,069; Re 28,341). This zeolite is formed by hydrothermal capitalization of sources of aluminum and of silicon in the presence of a structuring agent and eventually an alkaline or earth-alkaline metal or a mixture of such metals.

The source of aluminum can be sodium aluminate. The source of silicon can be, for example, a silica soil, solid amorphous silica, or a silicate. It is also possible to use as sources of silicon and aluminum the amorphous or crystalline alumino-silicates. The alkalinity of the medium can be adjusted by sodium hydroxide.

The tetraethyl ammonium ion is generally used as structuring agent for the synthesis of the beta zeolite. It is introduced in the form of the hydroxide or salt.

The silica/alumina ratio of the raw beta zeolite of synthesis can change from 10 to 200. The process according to the invention allows increasing the ratio independently of its starting value.

The dealuminization is accompanied by the separation of the structuring agent such as the tetraethyl ammonium ion. The latter can be recovered from the reaction medium. Tetraethyl ammonium is a particularly expensive compound, and therefore, its recovery constitutes an evident advantage. In the prior art the structuring agent was eliminated by calcination. During this operation the molecule of structuring agent is decomposed. The tetraethyl ammonium decomposes, for example, in nitrogen and carbon oxides in water.

The acid used for the dealuminization is a strong inorganic or organic acid. Among the strong organic acids can be mentioned formic acid, trichloroacetic acid or trifluoroacetic acid. Among the strong inorganic acids can be mentioned hydrochloric acid, sulfuric acid, or nitric acid. Nitric acid is particularly convenient.

The concentration of nitric acid is below 20N, preferably between about 2 and about 15N, or more preferably between about 5 and about 15N. The concentration of the acid is the main parameter which determines the degree of dealuminization. With a weak concentration the dealumization remains partial. On the other hand, the dealuminization with an acid, preferably nitric acid, of a concentration comprised between about 10 and about 15N results in a product essentially completely dealuminized, and therefore essentially silicic. For a given concentration of acid, the rate of dealuminization likewise depends on the volume of acid used, on the temperature and on the duration of the treatment.

The silica/alumina ratio of the essentially silicic beta zeolite is greater than or equal to about 800 and its crystallinity is greater than or equal to about 80%. The silica/alumina ratio can reach about 4000 or more, which means that the aluminum concentration is less than 0.02% by weight. The essentially silicic form of the beta zeolite is believed to be novel.

The dealuminization takes place at about room temperature, but in general, temperatures between about 20° C. and about 100° C. and preferably between about 70° C. and about 90° C can be used.

The duration of the dealuminization is variable, being in general between about 15 minutes and about 40 hours, preferably between about 30 minutes and about 20 hours.

As previously indicated, it is also possible to introduce the acid in the synthetic medium of the zeolite without previously isolating it from its mother liquor. This method allows almost quantitative recovery of the structuring agent involved in the synthesis. The recovery can be effected, for example, by liquid/liquid extraction or on cationic resin. This recovered structuring agent can be used for a new synthesis of zeolite.

After dealuminization the solid is separated from the reaction medium, for example, by filtration or centrifugation. The solid is then washed and dried.

After the dealuminization, the silicon/aluminum ratio is determined by elementary analysis. The crystallinity of the solids is measured by diffraction of the X rays. It is observed that the dealuminization involves only very small losses of crystallinity. The essentially silicic beta zeolite preserves at least 80% of its original crystallinity.

When subjecting the dealuminized beta zeolite to a calcination of 10 hours at 750° C. under air flux, no loss of crystallinity has been observed, which confirms the good thermal stability of the solid.

The process according to the invention makes it possible for one to obtain partly dealuminized zeolites having a variable silica/alumina ratio and of essentially silicic zeolites.

The partly dealuminized zeolites and in particular the beta zeolite have strong acid sites and good thermal stability. They are excellent catalysts for the transformation of hydrocarbons and in particular catalysts for cracking, isomerization and alkylation. Their effectiveness is remarkably stable in the course of time.

Their hydrophobic nature is a function of the degree of dealuminization. The zeolites and in particular the essentially silicic beta zeolites have a very marked hydrophobic/organophilic nature. Their great capacity of selective adsorption in respect to organic molecules is the result of the organophilic nature associated with the separation of the aluminum atoms and at the same time with their considerable porosity.

This considerable porosity has been confirmed by measurements of nitrogen adsorption at 77.K which for the beta zeolite lead to a specific surface according to the BET method of 440 m$_2$/g and a porous volume of 0.21 ml/g.

The hydrophobic/organophilic nature of the dealuminized beta zeolite is determined by the butanol test described in European patent EP-13451. This test is a measure of the selectivity of adsorption of the zeolitic adsorbents for the organic molecules in case of competition between the adsorption of water and of less polar organic molecules.

By virtue of its great affinity with organic molecules less polar than water, the dealuminized beta zeolite and in particular the essentially silicic beta zeolite can be used as adsorbents to eliminate the traces of organic molecules from water or air.

The beta zeolite dealuminized according to the invention can be used pure both for catalysis and for adsorption. It is also possible to formulate it in the form of granules, extrusions, and spheres, with the aid of a binder such as clay, alumina, silica or a silica-alumina. It is likewise possible to use the beta zeolite combined with another zeolite.

The examples that follow illustrate the invention without limiting it.

EXAMPLE 1

A beta zeolite is synthesized using a gel of the composition:

1 Al$_2$O$_3$, 1.53 Na$_2$O, 6.3 TEA$_2$O, 35 SiO$_2$, 570 H$_2$O

After ageing for 24 hours at room temperature, the gel is heated for 24 hours at 150° C. The solid is recovered by filtration.

The structure determined by X rays corresponds to the beta zeolite. The crystallinity is 100%.

EXAMPLES 2 TO 8

5g of beta zeolite of Example 1, of 100% crystallinity and having the composition in oxide moles corresponding to:

0.06 Na$_2$O, TEA$_2$O, AL$_2$O$_3$, 32 SiO$_2$, 8.1 H$_2$O was treated with 500 ml of a solution of nitric acid at concentrations of from 2.2N to 12N, at 80° C. for 4 hours. The solid was isolated by filtration and then washed with water. After treatment the silicon/aluminum ratio was determined by elementary analysis, the crystallinity of the solids was measured by diffraction of the X rays and their capacity for adsorption of water and of n-hexane was evaluated by gravimetry. After calcination at 550° C. for 10 hours under air flux no loss of crystallinity was observed.

Table 1 summarizes the silica/alumina ratios, the crystallinity and the capacities of adsorption of the samples as functions of the concentration of the nitric acid.

TABLE 1

| EX | Concentration of acid mole/l | % SiO$_2$/Al$_2$O$_3$ | % crystallinity | Capacity of absorption % by weight H$_2$O | n-hexane |
|---|---|---|---|---|---|
| 2 | 2.2 | 46 | 100 | 5.0 | 17 |
| 3 | 2.9 | 56 | 100 | 4.5 | 17 |
| 4 | 4.3 | 74 | 100 | 4.1 | 18 |
| 5 | 5.7 | 164 | 80 | 2.6 | 19 |
| 6 | 7.2 | 270 | 85 | 1.5 | 16 |
| 7 | 11.5 | 850 | 80 | 1.0 | 14 |
| 8 | 12 | 4000 | 80 | 1.0 | 12 |

EXAMPLE 9

A beta zeolite is crystallized under the conditions of Example 1. 286 g of the suspension containing the zeolite and the mother liquors are treated with 2 liters of a solution of nitric acid 14.4N at 80° C. for 24 hours. After the treatment there are recovered 47 g beta zeolite, 100% crystalline and with a Si/Al ratio equal to 950. The tetraethyl ammonium contained in the mother liquors is recovered on cationic resin.

EXAMPLE 10

The beta zeolite dealuminized according to Example 4 was used as a catalyst for cracking of isooctane at 360° C., 1 bar total pressure, an N$_2$/hydrocarbon ratio of 70 and a spatial speed (weight of hydrocarbon/weight of zeolite.hour) of 1h$^{-1}$. The conversion was 30% and it was stable in the course of time.

EXAMPLE 11

The beta zeolite dealuminized according to Example 4 was used as a catalyst for cracking n-heptane, at 400° C., 1 bar total pressure, an N$_2$/hydrocarbon ratio of 68 and a spatial speed of 0.23 h$^{-1}$. The conversion was 20% and it was stable in the course of time.

EXAMPLE 12

The selectivity of adsorption on dealuminized beta zeolite of organic molecules in competition with water was determined. The zeolite of Example 8 was activated by heating in open air at 550° C for 10 hours. After heating, 0.5 g of the zeolite powder was put in suspension in a solution of 1% by weight butanol in water. The suspension was stirred for 2 hours, which was sufficient time to attain equilibrium. The analysis of the zeolite after adsorption showed a capacity of adsorption of 12% by weight in butanol. The residual concentration of butanol in water was 0.4% by weight.

EXAMPLE 13

The same test carried out on the zeolite of Example 9 gave a residual concentration of butanol of 0.45% by weight, which corresponds to a capacity of adsorption of 11% by weight.

What is claimed is:

1. A process for dealuminization of a synthetic zeolite having pores with the diameter of aperture of the channels of greater than or equal to about 0.7 nm and a silica/alumina ratio greater than or equal to about 6, which comprises subjecting said raw zeolite while containing the structuring agent, to acid leaching.

2. The process according to claim 1, wherein the raw zeolite of synthesis corresponds to the formula:

$$\frac{x}{n} M_2O \cdot yS \cdot Al_2O_3 \cdot zSiO_2 \cdot wH_2O$$

wherein

M is a metal cation of valence n,
S is the structuring agent $\frac{x}{n}$ is less than 1 y has a value of from 0.5 to 8
z has a value of from 6 to 200
w has a value of from 4 to 50.

3. The process according to claim 1, wherein the synthetic zeolite is selected from the group consisting of beta zeolite and ZSM-20.

4. The process according to claim 1, wherein the synthetic zeolite is beta zeolite.

5. The process according to claim 1, wherein the raw zeolite is separated from its mother liquors prior to the acid leaching.

6. The process according to claim 1, wherein the raw zeolite is not separated from its mother liquors prior to the acid leaching.

7. The process according to claim 1, wherein the acid is a strong organic acid selected from the group consisting of formic acid, trichloroacetic acid, and trifluoroacetic acid.

8. The process according to claim 1, wherein the acid is a strong inorganic acid selected from the group consisting of hydrochloric acid, sulfuric acid and nitric acid 9. The process according to claim 8 wherein the strong inorganic acid is nitric acid.

10. The process according to claim 1, wherein the concentration of the acid is above 2N.

11. The process according to claim 10, wherein the concentration of the acid is between about 2 and 15N.

12. The process according to claim 10, wherein the concentration of the acid is between about 5 and about 15N.

13. The process according to claim 1, wherein from about 5 to about 150 ml of acid solution per gram of zeolite are used.

14. The process according to claim 1, wherein the dealuminization temperature is between about 20° and 100° C.

15. The process according to claim 1, wherein the dealuminization temperature is between about 70° and about 90° C.

16. The process according to claim 1, wherein the duration of dealuminization is between about 1 and about 40 hours.

17. The process according to claim 1, wherein the duration of dealuminization is between about 3 and about 30 hours.

18. A catalyst for the transformation of hydrocarbons comprised of a zeolite dealuminized according to the process described in claim 1.

19. A selective organophilic adsorbent comprised of a zeolite dealuminized according to the process described in claim 1.

20. An essentially silicic beta zeolite, having a silica/alumina ratio of greater than or equal to about 800 and a crystallinity of greater than or equal to about 80%.

21. A zeolite according to claim 20, having a silica/alumina ratio of greater than or equal to about 4000 and a crystallinity of greater than or equal to about 80%.

* * * * *